United States Patent Office 2,773,561
Patented Dec. 11, 1956

2,773,561

SILVER-PALLADIUM FILM FOR SEPARATION AND PURIFICATION OF HYDROGEN

James B. Hunter, Havertown, Pa., assignor to The Atlantic Refining Company, Philadelphia, Pa., a corporation of Pennsylvania No Drawing. Application May 2, 1955,
Serial No. 505,563

4 Claims. (Cl. 183—115)

This invention relates to a method of separating hydrogen from fluid mixtures containing hydrogen and other undesirable fluids. More particularly, this invention is concerned with a method of separating hydrogen from gaseous mixtures by permeating such hydrogen through a silver-palladium composition which is a barrier to all the gases except hydrogen. Furthermore, this invention pertains to a method for purifying fluid mixtures containing free hydrogen by selectively passing the hydrogen through a barrier of silver-palladium leaving the other undesirable fluids behind.

Free hydrogen is readily obtainable by several well known processes. For example, hydrogen can be produced by passing steam over hot carbon or iron, by electrolysis of aqueous solutions, by the decomposition of hydrogen containing compounds, by the fractionation of mixtures containing hydrogen, by the action of acids on metals and other methods. Of these processes, some produce hydrogen which is usually too impure for most uses. Others produce hydrogen of sufficient purity but they require complicated and expensive equipment which makes the cost of any large scale production economically unfeasible.

Due to the need for substantially pure hydrogen, the development of methods of economically separating pure hydrogen from fluid mixtures containing free hydrogen or of inexpensively purifying hydrogen gases containing a detrimentally large percentage of impurities has become very important. For years different and better processes and apparatus have been suggested and tested but presently there has not been developed an entirely satisfactory solution.

One method used for separating hydrogen from fluid mixtures and purifying hydrogen gases consists of permeating hydrogen through thin films or sheets of palladium. An example of this process is found in United States Patent 1,174,631 to Walter O. Snelling. In the Snelling patent certain gases containing hydrogen are brought into contact with one side of a very thin sheet or film of palladium. This palladium is maintained at an elevated temperature and is supported by a base of porous earthenware or alundum. By maintaining a lower pressure on the other side of the palladium, hydrogen is selectively permeated through the palladium and released in a purified form on the low pressure side.

Several types and forms of films have been suggested for use in selectively passing hydrogen. For example, the Snelling patent suggests the use of platinum in the form of a flat sheet. The United States patent to Weller, 2,540,152, discloses a plastic membrane comprising materials selected from the group consisting of polystyrene and ethyl cellulose. The United States Patent 1,253,661 to King et al. shows the use of pure palladium tubes. Several different procedures and apparatus also have been developed for employing the use of such barriers to separate hydrogen from gases. Examples of such procedures and apparatus are shown in the United States Patent 2,597,907 to W. A. Steiner et al. and the King et al. patent previously referred to.

The object of this invention is to provide a novel process for separating hydrogen from fluid mixtures.

Another object of this invention is to provide a novel process for purifying hydrogen gases.

A further object of this invention is to provide a metallic film which is a barrier to fluids other than free hydrogen, such film being more permeable to hydrogen than other metallic films which heretofore have been utilized for separating hydrogen from other fluids.

Briefly, this invention involves the permeation of hydrogen through a thin film of silver-palladium. In accordance with this process hydrogen under pressure is brought into contact with one side of a thin layer or film of non-porous silver-palladium supported in any well known manner. The other side of the silver-palladium layer is maintained at a lower pressure. Therefore the hydrogen is permeated through the film of silver-palladium where it is released and removed in a purified form.

Before a detailed explanation of my invention is given, the meaning of permeation and permeability as used throughout this application should be explained. By permeation is meant the overall process for the transfer of gas from a high pressure side of a non-porous film, through the solid material of the film and out of the low pressure side thereof. It is essential in this invention that the film be non-porous, that is, to be free from holes, voids, pores and other defects which effect the continuity of the film. Any holes, voids and pores will permit the gas to pass from one side of a film to the other but will destroy the selective permeation of the hydrogen through the solid material of the film. Therefore, by permeability we mean the rate of permeation of gas through the solid material rather than through holes, pores or voids. Hydrogen permeability means the rate at which hydrogen will selectively pass through the material of the film. It should be understood that it is almost impossible to make an entirely non-porous film and therefore the gas flowing from one side of a non-porous film to another will usually include a very minor amount of undesirable gas flowing through pores. Nevertheless, for all purposes in the use of the non-porous films of this invention the rate of flow of gas from one side to the other is considered to be equal to hydrogen permeability of the film.

The permeability of hydrogen through films is dependent upon several factors. The most important of these factors are the thickness of the film, the pressure differential between the high and low pressure side of the film, the temperature of the film and the material from which the film is made.

In general, the selectivity of any film is independent of its thickness. In other words, the ability of the film to permit gas to permeate therethrough does not depend upon the thickness of the film. However, the rate of permeation is inversely proportional to the thickness of the film. Since the permeability of a film is dependent upon the thickness, it is evident that the use of the thinnest film possible is most desirable for purposes of selectively separating hydrogen from other gases. There is a limit to the thinness of any film which can be used because of the inherent pin holes which will result if the film is made too thin. Preferably the films of the present invention should be of a thickness in the range of from about 0.0001 to 0.005 inch.

As previously stated, the permeability of a film is also dependent directly upon the pressure differential maintained between the high and low pressure side of the film. The higher the pressure differential the greater the permeability of the film. The extent of the use of high pressure differential inherently also has an economic limit. Nevertheless, for purposes of this invention any pressure differential can be utilized that will not destroy the film.

The temperature of the film also affects its permeability. In general, the permeation rates through solids increases exponentially with the increase in temperature. As a result, when practicing the process of this invention, the film is kept at a relatively high temperature. It should be understood, however, that the particular temperature at which the film is maintained does not form a part of this invention.

The material from which the film is made also has a great bearing upon the rate of permeation of hydrogen through the film. As referred to previously, several different materials have been suggested for use. Among these materials is palladium which will allow permeation of hydrogen through it and at the same time will serve as a barrier to other gases.

I have found that a palladium alloy composition containing silver will allow a greater rate of hydrogen permeation than will pure palladium. The reason or theory behind this phenomenon has not been exactly established. Nevertheless, evidence of this marked increase in permeability of silver-palladium as compared to pure palladium has been shown in laboratory experiments.

The preferred compositions of metallic film to be used in this invention are silver-palladium compositions comprising between 10% to 50% of silver. These preferred compositions as compared to other silver-palladium compositions give substantially high rates of hydrogen permeation through the film resulting in a better and more efficient selective separation of hydrogen and the consequential purification of hydrogen gases.

Within the above range, a comparably higher rate of hydrogen permeation is obtained with the use of a silver-palladium film comprising between about 20% to 40% silver. Therefore, a film of silver-palladium containing between about 20% to 40% silver should be considered to be the most preferred composition to be used in accordance with this invention.

The following table shows results of measurements of the hydrogen permeabilities of a silver-palladium film comprising approximately 27% silver as compared to a pure palladium film. In preparing this table, hydrogen was brought into contact with a very thin sheet or film of pure palladium having a thickness of .001 inch. The hydrogen was permeated through the film at various conditions of temperature and pressure differential. The permeabilities of the film in cubic feet per hour per square foot was measured for various different conditions of pressure and temperature. After these permeabilities for pure palladium were measured, the silver-palladium film comprising 27% silver was substituted for the pure palladium film and for these same conditions the permeabilities of the new film were measured.

TABLE

*Permeability of hydrogen through Pd and Ag-Pd membrane 0.001" thick*

[Permeability in Cu. Ft./Hr./Sq. Ft.]

| P. s. i. g. | 450° C. | | | 550° C. | | |
|---|---|---|---|---|---|---|
| | Pd | Ag-Pd | %Δ | Pd | Ag-Pd | %Δ |
| 100 | 84 | 144 | 72 | 128 | 167 | 30 |
| 200 | 145 | 228 | 57 | 219 | 274 | 25 |
| 300 | 198 | 302 | 53 | 286 | 353 | 23 |

It is apparent from the above table that as compared with pure palladium film the hydrogen permeability of the silver-palladium film is much greater. The percent difference in permeability for the silver-palladium film as compared to that of the pure palladium film is shown in the columns marked %Δ. It is evident from this table that for the same temperature as the pressure differential was increased on each film, the hydrogen permeability increased. At the high pressure differentials, however, a percent difference between the permeability of the silver-palladium as compared to that of pure palladium is not as great as at a lower pressure. It should also be apparent from the table that at the higher temperature of 550° C. a percent difference in the permeability of the silver-palladium as compared to the pure palladium is not as great as at the lower temperature of 450° C. This apparently different affect of pressure and temperature on the permeabilities of the films is difficult to explain because the theory of the permeation of hydrogen through solids is not well established. Therefore, no explanation will be made for such difference. For purposes of this invention, the important fact to note is that regardless of the effects by temperature and pressure the permeability of the silver-palladium in each case is greater than the pure palladium.

It should be understood that this invention is not restricted to the use of any particular apparatus or shape or form of silver-palladium films. The silver-palladium films of this invention can be used in any form and shape and in conjunction with any procedure or apparatus which heretofore has been or which will be developed. For example, it can be used in the form of a tube, a membrane, or a coating on a porous backing. It would be within the scope of this invention to substitute the silver-palladium films of this invention for the films utilized in the different shapes and forms as taught by the art and as employed in the different apparatus and procedures which are adapted for separating free hydrogen from other fluids.

Having described my invention, it should be pointed out that the illustrations were not intended to limit my invention except in accordance with the scope of the appended claims.

I claim:

1. A process for the recovery of free hydrogen from a gaseous mixture comprising hydrogen and other gases comprising the steps of bringing said gaseous mixture into contact with one side of a thin non-porous film consisting essentially of a silver-palladium composition containing from 10% to 50% silver, causing the hydrogen of said gaseous mixture to permeate through said film and removing the permeated hydrogen from the opposite side of said film.

2. A process for the recovery of free hydrogen from a gaseous mixture comprising hydrogen and other gases comprising the steps of bringing said gaseous mixture into contact with one side of a thin non-porous film consisting essentially of a silver-palladium composition containing from 20% to 40% silver, causing the hydrogen of said gaseous mixture to permeate through said film and removing the permeated hydrogen from the opposite side of said film.

3. Process for purifying hydrogen gases consisting of hydrogen and other undesirable gases comprising the steps of bringing said hydrogen gas into contact with one side of a thin non-porous film consisting essentially of a silver-palladium composition containing from 10% to 50% of silver, maintaining a pressure differential between the two sides of said film, said one side being of a lower pressure than the other side thereby causing a portion of said hydrogen to permeate through said film, and removing the permeated hydrogen from the other side of said film.

4. A process for purifying hydrogen gases consisting of hydrogen and other undesirable gases comprising the steps of bringing said hydrogen gas into contact with one side of a thin non-porous film consisting essentially of a silver-palladium composition containing from 20% to 40% of silver, maintaining a pressure differential between the two sides of said film, said one side being of a lower pressure than the other side thereby causing a portion of said hydrogen to permeate through said film, and removing the permeated hydrogen from the other side of said film.

References Cited in the file of this patent

UNITED STATES PATENTS

| | | |
|---|---|---|
| 1,166,129 | Heyl | Dec. 28, 1915 |
| 1,415,233 | Fahrenwald | May 9, 1922 |
| 2,444,222 | Craig | June 29, 1948 |
| 2,671,337 | Aulsberg | Mar. 9, 1954 |